United States Patent
Coultate

(10) Patent No.: US 10,584,680 B2
(45) Date of Patent: Mar. 10, 2020

(54) METHOD FOR OPERATING A WIND TURBINE GENERATOR

(71) Applicant: INSIGHT ANALYTICS SOLUTIONS HOLDINGS LIMITED, Nottingham (GB)

(72) Inventor: John Karl Coultate, Nottingham (GB)

(73) Assignee: INSIGHT ANALYTICS SOLUTIONS HOLDINGS LIMITED, Nottingham (GB)

(*) Notice: Subject to any disclaimer, the term of this patent is extended or adjusted under 35 U.S.C. 154(b) by 551 days.

(21) Appl. No.: 14/371,001

(22) PCT Filed: Jan. 14, 2013

(86) PCT No.: PCT/GB2013/050070
§ 371 (c)(1),
(2) Date: Jul. 8, 2014

(87) PCT Pub. No.: WO2013/104930
PCT Pub. Date: Jul. 18, 2013

(65) Prior Publication Data
US 2015/0003983 A1    Jan. 1, 2015

(30) Foreign Application Priority Data
Jan. 12, 2012 (GB) .................................. 1200491.7

(51) Int. Cl.
*F03D 7/02* (2006.01)
*F03D 17/00* (2016.01)
(Continued)

(52) U.S. Cl.
CPC ............. *F03D 7/028* (2013.01); *F03D 7/043* (2013.01); *F03D 17/00* (2016.05); *F03D 9/25* (2016.05)

(58) Field of Classification Search
CPC ...... F03D 7/028; F03D 7/0284; F03D 7/0288; F03D 7/0292; F03D 17/00; F03D 7/043; F03D 9/25
(Continued)

(56) References Cited

U.S. PATENT DOCUMENTS

| | | | |
|---|---|---|---|
| 8,095,244 B2 | 1/2012 | Morjaria et al. | |
| 2003/0127862 A1* | 7/2003 | Weitkamp | F03D 7/0276 290/44 |

(Continued)

FOREIGN PATENT DOCUMENTS

| | | | |
|---|---|---|---|
| EP | 2302208 | * 9/2009 | ............... F03D 7/02 |
| EP | 2267305 A2 | 12/2010 | |

(Continued)

*Primary Examiner* — William V Gilbert
(74) *Attorney, Agent, or Firm* — David D. Brush; Westman, Champlin & Koehler, P.A.

(57) ABSTRACT

A method for modifying the power output of a wind turbine generator. The power output of a wind turbine generator can be modified based on the rate of fatigue and/or damage calculated for components within the wind turbine generator. Damage and/or fatigue can be calculated based on current or predicted future operating conditions. The turbine operation can be modified if the cost of damage and/or cost of fatigue is less than a value for the electricity produced. In this case, the rate of fatigue is calculated using models of the wind turbine generator or its components, where the model may be based on a metamodel or by an Equivalent Operating Hours approach.

10 Claims, 3 Drawing Sheets

(51) Int. Cl.
*F03D 7/04* (2006.01)
*F03D 9/25* (2016.01)

(58) Field of Classification Search
USPC .......................................................... 700/36
See application file for complete search history.

(56) References Cited

U.S. PATENT DOCUMENTS

| | | |
|---|---|---|
| 2006/0273595 A1 | 12/2006 | Avagliano et al. |
| 2009/0295160 A1* | 12/2009 | Wittekind ............. F03D 7/0276 290/44 |
| 2010/0237617 A1* | 9/2010 | Vyas ....................... F03D 7/043 290/44 |
| 2011/0140428 A1 | 6/2011 | Wakata et al. |
| 2011/0142621 A1 | 6/2011 | Reddy et al. |
| 2012/0101644 A1* | 4/2012 | Evans .................. G05B 13/026 700/287 |
| 2013/0006439 A1* | 1/2013 | Selvaraj ................ G06Q 10/06 700/297 |
| 2014/0327569 A1* | 11/2014 | Fun ....................... G01S 13/951 342/26 D |

FOREIGN PATENT DOCUMENTS

| | | |
|---|---|---|
| EP | 2325480 A1 | 2/2011 |
| EP | 2302206 A1 | 3/2011 |
| EP | 2302208 A1 | 3/2011 |
| WO | 2009133161 A2 | 11/2009 |
| WO | 2010080391 A2 | 7/2010 |

* cited by examiner

METHOD FOR OPERATING A WIND TURBINE GENERATOR

BACKGROUND OF THE INVENTION

The present invention is related to methods for operating a wind turbine generator, and in particular to methods for modifying operation based on the predicted effect of present or predicted future operating conditions.

Wind turbine installations comprise components that have an expected life. Operating the installation to produce more than the rated power output will cause fatigue and/or damage on the wind turbine generators comprising the installation, and on its components, thereby reducing its baseline life.

US2006/0273595 discloses a method for intermittently increasing the rated power output of a wind turbine generator based on assessments of the operating conditions such that the baseline life of the wind turbine generators is not compromised.

U.S. Pat. No. 8,095,244 discloses a method for a wind plant to meet a desired power output by causing at least one of the wind turbine generators comprising the plant to boost its output.

Diongue et al. (Applied Energy, Elsevier, 2009, 86 (4), pp. 505-510) describe a method for forecasting the German electricity price market for the period Aug. 15, 2000-Dec. 31, 2002 and test spot prices forecasts until one month ahead. The approach outperformed SARIMA-GARCH benchmark model. A number of other approaches are known in the art.

There is a limit to the total extra energy that can be provided by these features because of fatigue and/or damage and concomitant reduction in life. Neither of the above approaches actively manages wind turbine generator operating life at the increased rated power output or under boost conditions so as to maintain or improve utilisation of the life of the turbine.

Neither do these approaches, or other current methods of controlling a wind turbine, consider the cost impact of fatigue and/or damage on the wind turbine generator, or its components. Nor is the cost of electricity which the turbine is producing taken into account. This invention combines life models and cost information to modify the operation of the turbine.

BRIEF SUMMARY OF THE INVENTION

According to a first aspect of the invention, there is provided a method for controlling a power output of a wind turbine generator comprising the steps of: 5 obtaining operating parameters for the wind turbine generator; obtaining operating conditions for the wind turbine generator; calculating the amount of fatigue and/or damage caused to the wind turbine generator or components thereof under the operating conditions.

Preferably, the operating parameters are current operating parameters or future operating parameters.

Preferably, the operating conditions are current operating conditions or future operating conditions.

Preferably, the method additionally comprises the steps of: calculating a proportion of total life consumed for a component under the operating conditions; calculating an equivalent cost per unit time of running a component under the operating conditions; comparing the cost per unit time of running a component under the operating conditions with a value per unit time of electricity generated by the wind turbine.

Preferably, the value per unit time of electricity generated by the wind turbine generator is the current or forecast electricity market spot price.

Preferably, the operating parameters are wind parameters and wherein the step of obtaining operating parameters comprises measuring incoming wind parameters before they are experienced by the wind turbine generator.

Preferably, the operating conditions are future operating conditions and the step of obtaining operating conditions comprises predicting future operation conditions for the wind turbine generator from the incoming wind parameters.

Preferably, the wind parameters include one or more of incoming wind speed, wind turbulence, wind gusts and wind direction.

Preferably, the step of measuring wind parameters is done using LIDAR or other sensors mounted on or away from the wind turbine generator.

Preferably, the operating conditions include one or more of torque, speed, force, moment, displacement, power, voltage, current, strain, vibration, temperature, wind speed, wind turbulence, and wind direction.

Preferably, the components include one or more of gearbox, bearings, generator, blades, drivetrain, couplings, nacelle baseplate, tower, foundations, hub, blade pitch system, yaw system, and power electronics.

Preferably, the step of controlling the power output of the wind turbine generator comprises increasing the power output when the cost per unit time of running a component under the operating conditions is less than a value per unit time of electricity generated by the wind turbine.

Preferably, the step of controlling the power output of the wind turbine generator comprises reducing the power output when the cost per unit time of running a component under the operating conditions is greater than a value per unit time of electricity generated by the wind turbine.

Preferably, the step of controlling the power output of the wind turbine generator comprises maintaining the power output at a current level when the cost per unit time of running a component under the operating conditions is similar to a value per unit time of electricity generated by the wind turbine.

According to a further aspect of the invention, there is provided a method for operating a wind turbine generator comprising the steps of: obtaining operating parameters for the wind turbine generator; obtaining operating conditions for the wind turbine generator; calculating the amount of fatigue and/or damage caused to the wind turbine generator or components thereof under the operating conditions.

Preferably, the operating parameters are current operating parameters or future operating parameters.

Preferably, the operating conditions are current operating conditions or future operating conditions.

Preferably, the method additionally comprises the steps of: calculating a proportion of total life consumed for a component under the operating conditions; calculating an equivalent cost per unit time of running a component under the operating conditions; comparing the cost per unit time of running a component under the operating conditions with a value per unit time of electricity generated by the wind turbine.

Preferably, the value per unit time of electricity generated by the wind turbine generator is the current or forecast electricity market spot price.

Preferably, the operating parameters are wind parameters and wherein the step of obtaining operating parameters comprises measuring incoming wind parameters before they are experienced by the wind turbine generator.

Preferably, the operating conditions are future operating conditions and the step of obtaining operating conditions comprises predicting future operation conditions for the wind turbine generator from the incoming wind parameters.

Preferably, the wind parameters include one or more of incoming wind speed, wind turbulence, wind gusts and wind direction.

Preferably, the step of measuring wind parameters is done using LIDAR or other sensors mounted on or away from the wind turbine generator.

Preferably, the operating conditions include one or more of torque, speed, force, moment, displacement, power, voltage, current, strain, vibration, temperature, wind speed, wind turbulence, and wind direction.

Preferably, the components include one or more of gearbox, bearings, generator, blades, drivetrain, couplings, nacelle baseplate, tower, foundations, hub, blade pitch system, yaw system, and power electronics.

According to aspects of the invention, the step of calculating the fatigue and/or damage includes providing information about the wind turbine generator.

Preferably, the step of providing information about the wind turbine generator or a component thereof includes the step of providing: a nominal model of the wind turbine generator or a component thereof; a model unique to the specific wind turbine generator or a component thereof including information on one or more manufacturing variations of one or more components of the wind turbine generator or a component thereof; a fully coupled finite element model comprising nodes with six degrees of freedom unique to the wind turbine generator or a component thereof; or one or more meta-models, wherein the one or more meta-models are specific for each of the one or more components.

Preferably, the step of providing information about the wind turbine generator or a component thereof includes the step of providing an Equivalent Operating Hours (EOH) model.

According to aspects of the invention, the operating parameter is a control parameter.

This invention involves a novel application of a theoretical life model or damage model (e.g. an EOH model, a metamodel or other type of life model or damage model). The life model is used to understand the effective 'cost of fatigue' for the turbine which can then be compared to the current or predicted electricity market price. The effect is that the operation of the turbine is modified.

BRIEF DESCRIPTION OF THE SEVERAL VIEWS OF THE DRAWING

The invention will now be described, by way of example only, with reference to the accompanying drawings, in which.

DETAILED DESCRIPTION OF THE INVENTION

Methods of operating a wind turbine generator are disclosed. The term wind turbine generator is understood to include a wind farm comprising wind turbine generators.

Figure 1:
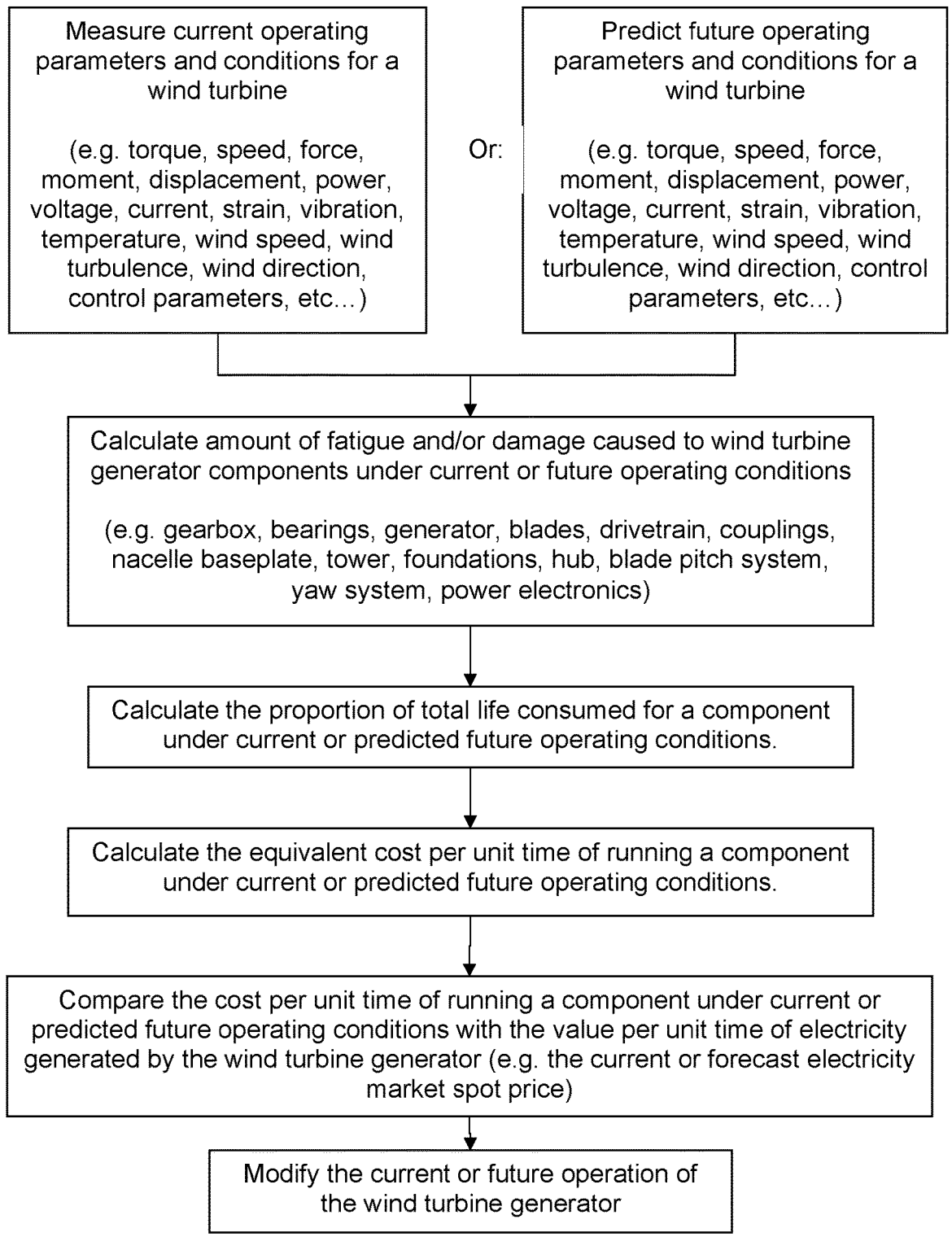
FIG. 1 is a flow chart for modifying the operation of a wind turbine generator based on fatigue and/or damage caused by current or future operating parameters.

An exemplary embodiment of the present invention will now be described with reference to FIG. 1, which shows an approach for modifying the operation of a wind turbine generator based on fatigue and/or damage caused by current or future operating parameters.

In a first step, operating parameters for a wind turbine generator are determined. The operating parameters can be current or future (predicted) operating conditions, and can be, for example one or more of torque, speed, force, moment, displacement, power, voltage, current, strain, vibration, temperature, wind speed, wind turbulence, and wind direction. This data can be measured directly or calculated indirectly from other measurements or provided from a SCADA system.

In a second step, the amount of fatigue and/or damage caused to wind turbine generator components under operating conditions is calculated. The operating conditions can be current or future (predicted) operating conditions. The wind turbine generator components can be, for example, one or more of gearbox, bearings, generator, blades, drivetrain, couplings, nacelle baseplate, tower, foundations, hub, blade pitch system, yaw system, and power electronics.

In a third step, the proportion of total life consumed for a component under the operating conditions is calculated.

In a fourth step, the equivalent cost per unit time of running a component under the operating conditions is calculated.

In a fifth step, the cost per unit time of running a component under the operating conditions is compared with a value per unit time of electricity generated by the wind turbine. This may be, for example, the current or forecast electricity market spot price. The forecast spot price can be obtained, for example, by the method of Diongue et al.

In a sixth step, operation of the wind turbine generator is modified.

Figure 2:
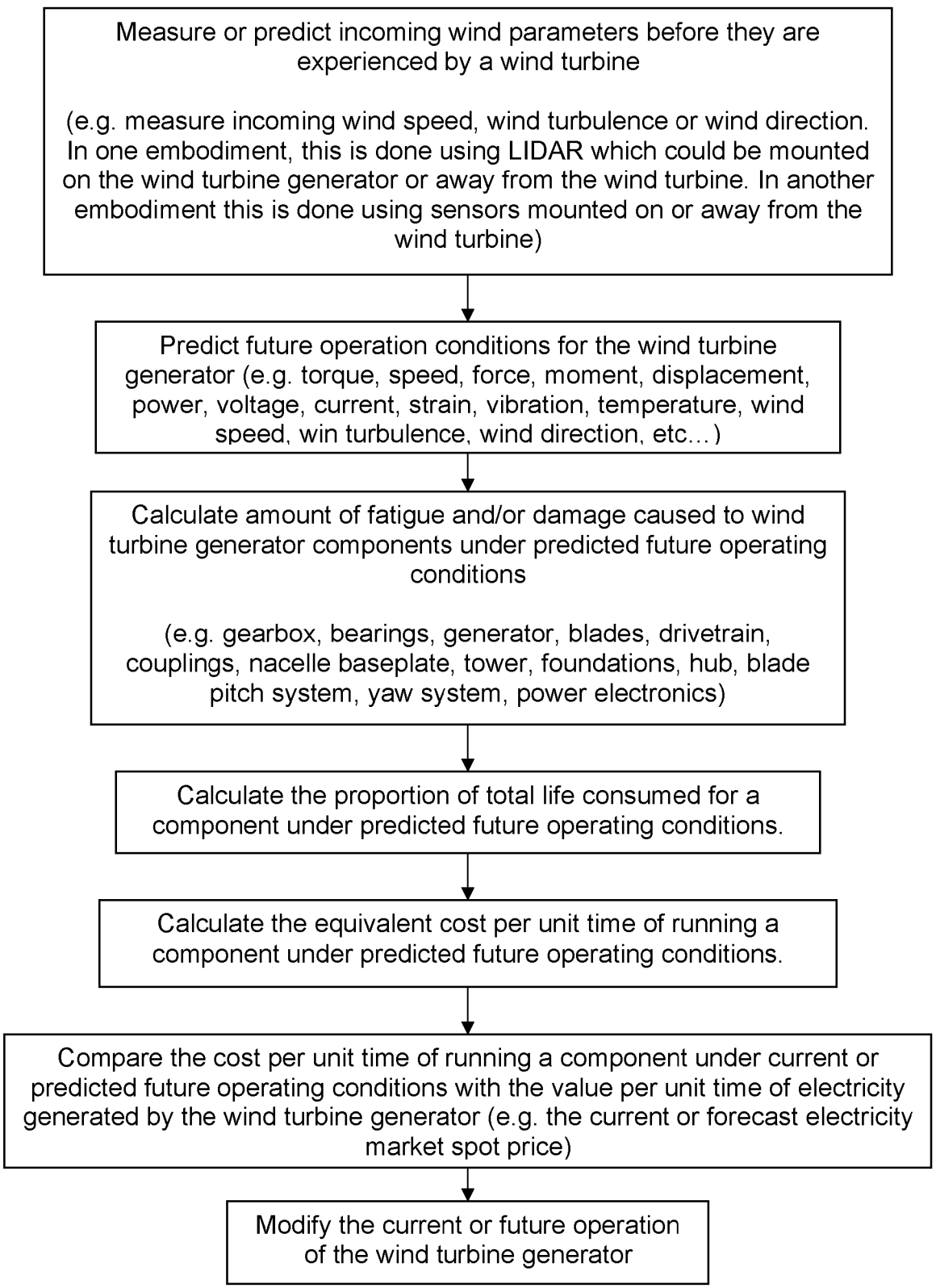
FIGS. 2 and 3 are flow charts for modifying the operation of a wind turbine generator based on the measurement of incoming gusts and/or wind conditions before they actually hit the turbine.

A second exemplary embodiment will now be described with reference to FIG. 2, which shows an approach for modifying the operation of a wind turbine generator in which incoming gusts and/or wind conditions are measured before they hit the turbine.

In a first step, incoming wind parameters are measured before they are experienced by a wind turbine. This step includes, for example, measuring incoming wind speed, wind turbulence or wind direction. This can be done using LIDAR which could be mounted on the wind turbine generator or away from the wind turbine. This can be done using sensors mounted away from the wind turbine. The information could also be provided from one or more of weather forecasts, seasonal variation, statistics from previous operations, statistics from current operations, or met-mast sensor data.

In a second step, future operation conditions for the wind turbine generator are predicted. The conditions include, for example, one or more of torque, speed, force, moment, displacement, power, voltage, current, strain, vibration, temperature, wind speed, wind turbulence, and wind direction. This data can measured directly or calculated indirectly from other measurements or provided from a SCADA system.

In a third step, the amount of fatigue and/or damage caused to wind turbine generator components under predicted future operating conditions is calculated. Components include, for example, one or more of gearbox, bearings, generator, blades, drivetrain, couplings, nacelle baseplate, tower, foundations, hub, blade pitch system, yaw system, and power electronics.

In a fourth step, the proportion of total life consumed for a component under current or predicted future operating conditions is calculated.

In a fifth step, the equivalent cost per unit time of running a component under current or predicted future operating conditions is calculated.

In a sixth step, the cost per unit time of running a component under current or predicted future operating conditions is compared with the value per unit time of electricity generated by the wind turbine. This can be, for example, the current or forecast electricity market spot price.

In a seventh step the current or future operation of the wind turbine generator is modified.

Figure 3:
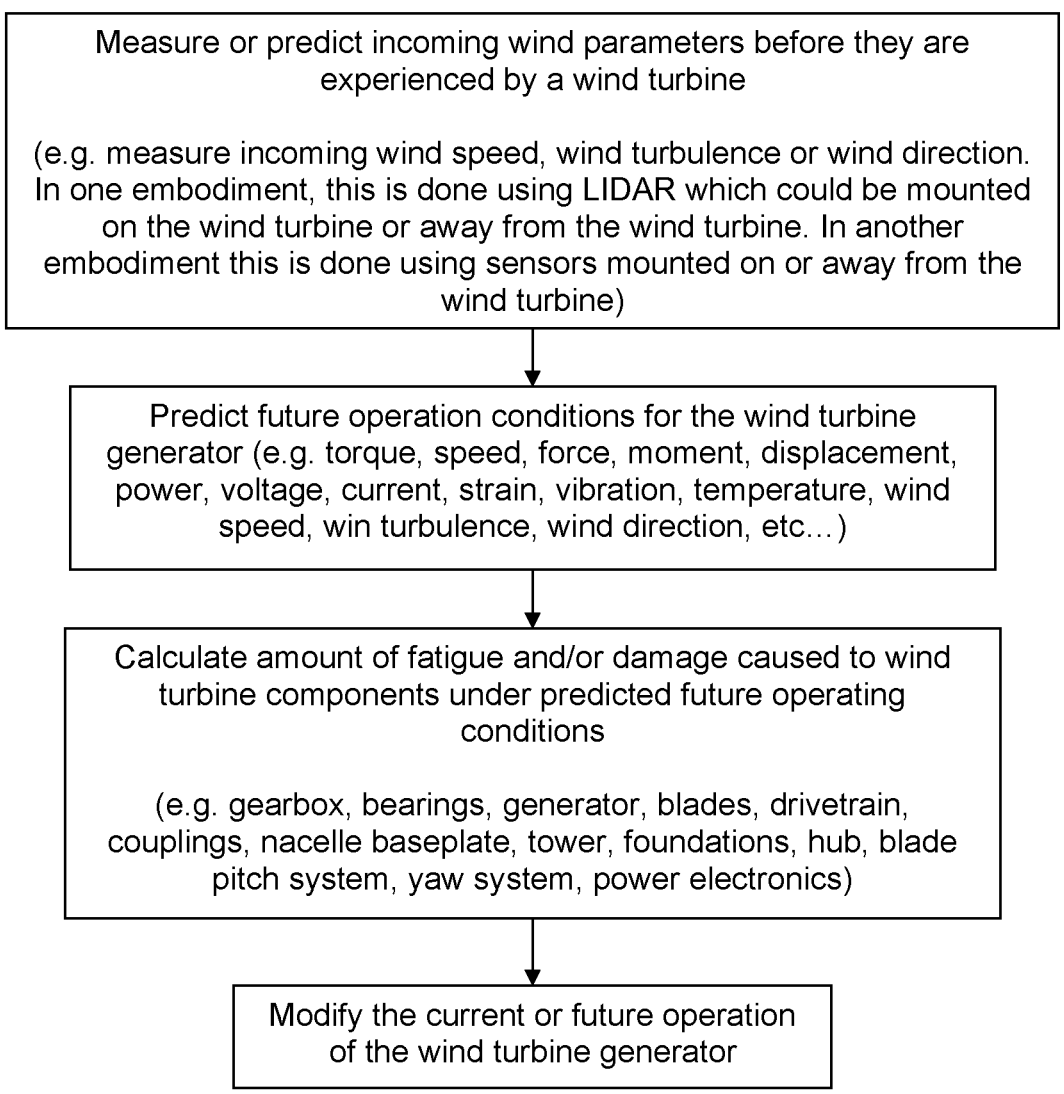

A third exemplary embodiment will now be described with reference to FIG. 3, which shows an approach for modifying the operation of a wind turbine generator by measuring incoming gusts and/or wind conditions before the hit the wind turbine.

In a first step, incoming wind parameters are measured before they are experienced by a wind turbine. This can include, for example, measuring incoming wind speed, wind turbulence or wind direction. This can be done using LIDAR which could be mounted on the wind turbine generator or away from the wind turbine. This can be done using sensors mounted away from the wind turbine. The information could also be provided from one or more of weather forecasts, seasonal variation, statistics from pervious operations, statistics from current operations, or met-mast sensor data.

In a second step, future operation conditions for the wind turbine generator are predicted. The operating conditions can include, for example, one or more of torque, speed, force, moment, displacement, power, voltage, current, strain, vibration, temperature, wind speed, wind turbulence, and wind direction. This data can measured directly or calculated indirectly from other measurements or provided from a SCADA system.

In a third step, the amount of fatigue and/or damage caused to wind turbine generator components under predicted future operating conditions is calculated. The components can include, for example, one or more of gearbox, bearings, generator, blades, drivetrain, couplings, nacelle baseplate, tower, foundations, hub, blade pitch system, yaw system, and power electronics.

In a fourth step, the current or future operation of the wind turbine generator is modified.

Fatigue and/or damage caused to wind turbine generator components can be calculated or determined in a number of ways. In one approach, the step of assessing damage comprises the step of providing information on the wind turbine generator or a component thereof, which includes providing: a nominal model of the gearbox, drive-train and/or generator; a model unique to the specific gearbox, drive-train and/or generator including information on one or more manufacturing variations of one or more components of the gearbox, drive-train and/or generator; a fully coupled finite element model comprising nodes with six degrees of freedom unique to the gearbox, drive-train and/or generator; or one or more meta-models, wherein the one or more meta-models are specific for each of the one or more components.

In another approach a metamodel may be used.

In another approach Equivalent Operating Hours (EOH) defines damage as being equivalent to the damage caused to a wind or water turbine or components thereof by one hour of operation under rated operating conditions. The EOH is equal to a weighting factor related to the operational condition multiplied by a duration (or alternatively, frequency) of that condition. For any operation in which damage caused is the same as that expected to be caused under rated conditions, the EOH of a component after 1 h will be 1 h, and the weighting factor will be 1.0. If an operational event causes greater damage, then the EOH will be reduced accordingly. Thus, an operational event of duration of 0.2 h of duration and having a weighting factor of 0.7, then the EOH after 1 h will be 0.8×1+0.2×0.7=0.94.

Operating conditions may relate to previous, current or future operation of the wind turbine generator.

For example, the amount of fatigue and/or damage can be equated to a cost of fatigue for previous, current or future operation. The operation of the wind turbine generator can thus be compared to the spot price of electricity supplied to the grid, and the output of the wind turbine generator could be maintained at the current level or boosted or up-rated under conditions where the fatigue cost is less than the spot price.

Thus if electricity price is low and wind speed is high, the turbine can be de-rated the turbine; conversely, if electricity price is high and wind speed is high, the turbine can be fully rated.

This allows a wind turbine generator installation to be operated to ensure that the cost of generating electricity by the wind turbine installation does not exceed the revenue gained from selling that electricity. These values may vary to reflect an underlying demand and/or to reflect the unreliability of renewable sources of energy. Typically, when demand for electricity is high, the price is also high. Thus when the demand for electricity is high, the output of a wind turbine installation can be increased as described above.

In the foregoing methods, the operating parameter can be a control parameter. Control parameters are used to control the wind turbine operation at any wind condition and protect it while avoiding any mechanical or electrical overload. Different control strategies can be implemented through changing the control parameters and their values. Control parameters are any parameters collected by the control system and used to control the system, and include pitch angle, yaw position, power output, cut-in wind speed and others.

The invention claimed is:

1. A method for modifying operation of a wind turbine generator supplying electricity to a grid by combining a life model and cost information, comprising:
    obtaining wind parameters by:
        predicting incoming wind parameters before the predicted incoming wind parameters are experienced by the wind turbine generator using at least a measurement device mounted away from the wind turbine generator;
    predicting future operating conditions of the wind turbine generator, wherein the predicted operating conditions are associated with the predicted wind parameters;
    calculating an amount of fatigue and/or damage predicted to be caused to one or more components of the wind turbine generator during a time of running the wind turbine generator under the predicted operating conditions,
        wherein the one or more components of the wind turbine generator comprise one or more of a gearbox, bearings, a generator, blades, a drivetrain, couplings, a nacelle baseplate, a tower, foundations, a hub, a blade pitch system, a yaw system, and power electronics, and wherein the calculating of the amount of fatigue and/or damage comprises using the life model;

calculating a proportion of total life consumed by the wind turbine generator or the one or more components of the wind turbine generator under the predicted operating conditions from the amount of fatigue and/or damage;

calculating a cost per unit time of running a component of the wind turbine generator under the predicted operating conditions from the proportion of total life consumed;

comparing the calculated cost per unit time of running the component of the wind turbine generator under the predicted operating conditions with a spot price of electricity, wherein the spot price of electricity is a market value per unit time of electricity generated by the wind turbine generator and supplied to the grid; and after the comparison, increasing future power output of the wind turbine generator when the cost per unit time of running the component of the wind turbine generator under the predicted operating conditions is less than the spot price;

reducing the future power output when the cost per unit time of running the component of the wind turbine generator under the predicted operating conditions is greater than the spot price; and maintaining the future power output when the cost per unit time of running the component of the wind turbine generator under the predicted operating conditions is similar to the spot price, wherein operation of the wind turbine generator is improved in that a cost of generating electricity by the wind turbine generator does not exceed a revenue gained from selling the electricity generated by the wind turbine generator.

2. The method according to claim 1, wherein the life model comprises:

a nominal model of the wind turbine generator or a component thereof;

a model unique to the wind turbine generator or a component thereof including information on one or more manufacturing variations of one or more components of the wind turbine generator; or one or more meta-models, wherein the one or more meta-models are specific for each of the one or more components of the wind turbine generator.

3. The method according to claim 1, wherein the life model comprises an Equivalent Operating Hours (EOH) model.

4. The method according to claim 1, wherein the predicted incoming wind parameters are provided from information comprising one or more of: weather forecasts, seasonal variation, statistics from previous operations, statistics from current operations, and met-mast sensor data.

5. The method according to claim 1, wherein the market value per unit time of electricity generated by the wind turbine generator is a current or forecasted electricity market spot price.

6. The method according to claim 1 wherein the wind parameters include one or more of incoming wind speed, wind turbulence, wind gusts and wind direction.

7. The method according to claim 6 wherein the step of predicting wind parameters is done using LIDAR mounted away from the wind turbine generator, wherein the LIDAR is the measurement device.

8. The method according to claim 1 wherein the step of predicting wind parameters is done using sensors mounted away from the wind turbine generator, wherein the sensors is the measurement device.

9. The method according to claim 1 wherein the predicted operating conditions include one or more of torque, speed, force, moment, displacement, power, voltage, current, strain, vibration, temperature, wind speed, wind turbulence, and wind direction.

10. The method according to claim 1 wherein the components include one or more of gearbox, bearings, generator, blades, drivetrain, couplings, nacelle baseplate, tower, foundations, hub, blade pitch system, yaw system, and power electronics.

* * * * *